(No Model.)
O. M. FULLER.
TREE PROTECTOR OR INSECT BARRIER.
No. 256,561. Patented Apr. 18, 1882.
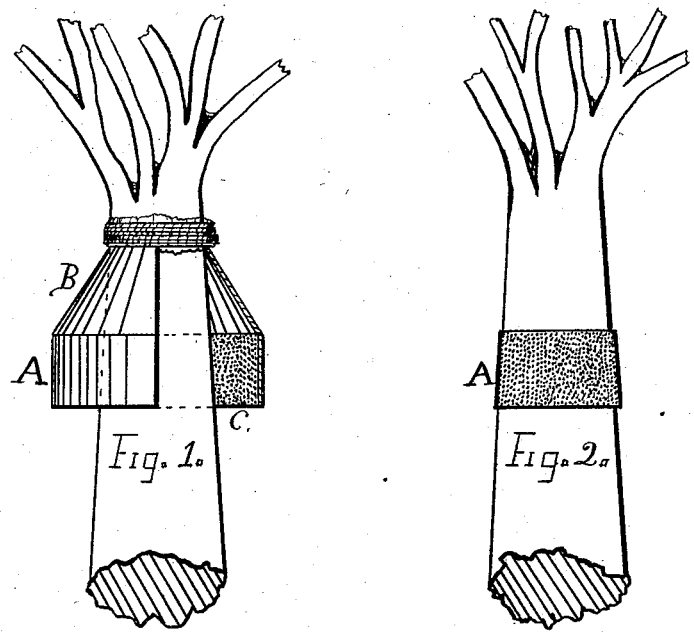
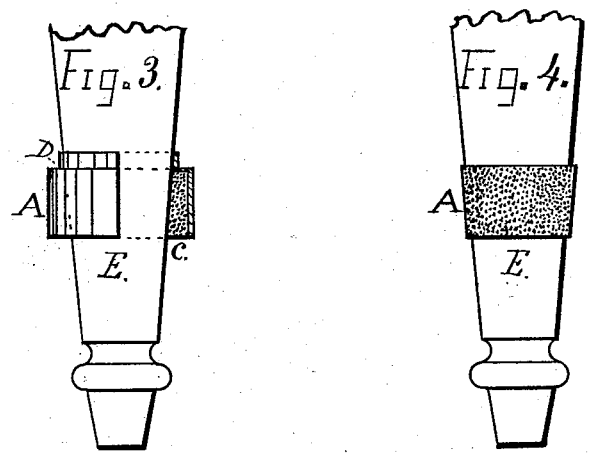

UNITED STATES PATENT OFFICE.

ORANGE M. FULLER, OF CATASAUQUA, PENNSYLVANIA.

TREE-PROTECTOR OR INSECT-BARRIER.

SPECIFICATION forming part of Letters Patent No. 256,561, dated April 18, 1882.

Application filed February 11, 1882. (No model.)

*To all whom it may concern:*

Be it known that I, ORANGE M. FULLER, a citizen of the United States, residing at Catasauqua, in the county of Lehigh and State of Pennsylvania, have invented a new and useful Improvement in Tree-Protectors or Insect-Barriers, of which the following is a specification.

My invention relates to improvements in insect-barriers, which invention or improvement is to be applied to the trunks of trees, bed-posts, table and refrigerator legs, and other articles where it is desired to stop or prevent the passage of creeping insects.

My invention consists in placing a band or girdle of wood, iron, tin, or any other material around the trunks of trees, bed-posts, table and refrigerator legs, and other articles, coating this girdle or band with tallow or other fatty, soft, or sticky substances sprinkled over with sand, as will be hereinafter described, referring to the annexed drawings, in which—

Figure 1 is a view, part in section, of my improvement as applied to the trunk of a tree and provided with a water-shed. Fig. 2 is a view of my improvement as applied to a tree without the water-shed. Fig. 3 is a view, part in section, of my improvement as applied to the posts of a bed, leg of a table, refrigerator, or other like articles, and provided with a guard to prevent the sand from being brushed off. Fig. 4 is a view of my improvement as applied to household articles without the guard.

Similar letters of reference refer to like parts.

The letter A, Fig. 1, represents a band, part in section, made from a strip of wood, tin, zinc, or any other material not less than two inches wide. To this strip is fastened a piece of oiled cloth, B. The oil-cloth, being cut the proper shape, is, with the strip A, placed around the trunk of a tree. The ends of the strip are joined together, and the edges of the oil-cloth are lapped and sewed together tight. The upper part is tied to the tree by a cord, as is shown in Fig. 1. The inside of the band A is first coated with tallow or other soft or sticky substance, and then sprinkled with sand, as shown at c, Fig. 1.

The letter A, Fig. 2, represents a band of tin, zinc, or other suitable material, which is tacked around the trunk of a tree, then coated with tallow or other soft or sticky substance and sprinkled with sand.

The letter A, Fig. 3, represents a band, part in section, made of tin or zinc. The part D is made to fit the post E, and is made smaller than the body A. The inside of the band is coated with tallow or other soft or sticky substance and sand, as shown at c, Fig. 3.

The letter A, Fig. 4, is a band of tin or zinc tacked around the post E and coated with tallow or other soft and sticky substance and sprinkled with sand.

My invention, to prevent the climbing of trees, table-legs, bed-posts, and the like by insects, acts as follows: The tallow or other fatty, soft, or sticky substance acts as a lubricant to the sand, and while its adhesion is sufficient to hold the sand, the weight of an insect attempting to pass over it will cause the sand to slip. The insect and sand will fall to the ground.

In applying my improvement to trees I prefer the arrangement with a water-shed, as shown in Fig. 1. This shed will prevent rain from washing off the sand.

For household articles I prefer the band made in form as shown in Fig. 3. Such a girdle will protect the sand and prevent it from being brushed off.

I prefer to make the band or girdle of tin; but other materials—such as wood, iron, zinc, paper, or oiled cloth—may be used. On bed-posts and table-legs and other like articles the girdle may be turned on the post or leg in form of an inverted saucer and the sand applied to the under side.

It is obvious that crushed glass, emery, and other grain-like substances may be used in place of sand.

At the opening of each season the girdles on trees will require to be scraped off and recoated.

I claim as my invention—

An insect guard or barrier, consisting of a band or girdle of any suitable material, in combination with a coating of fatty, soft, or sticky matter, and sand or other grain-like material, as shown and described, and for the purpose set forth.

ORANGE M. FULLER.

Witnesses:
JOHN SHINN,
OGDEN E. FREDERICK.